I. M. HARSHBARGER.
Hand-Seeder.
No. 45,923.                              Patented Jan. 17, 1865.
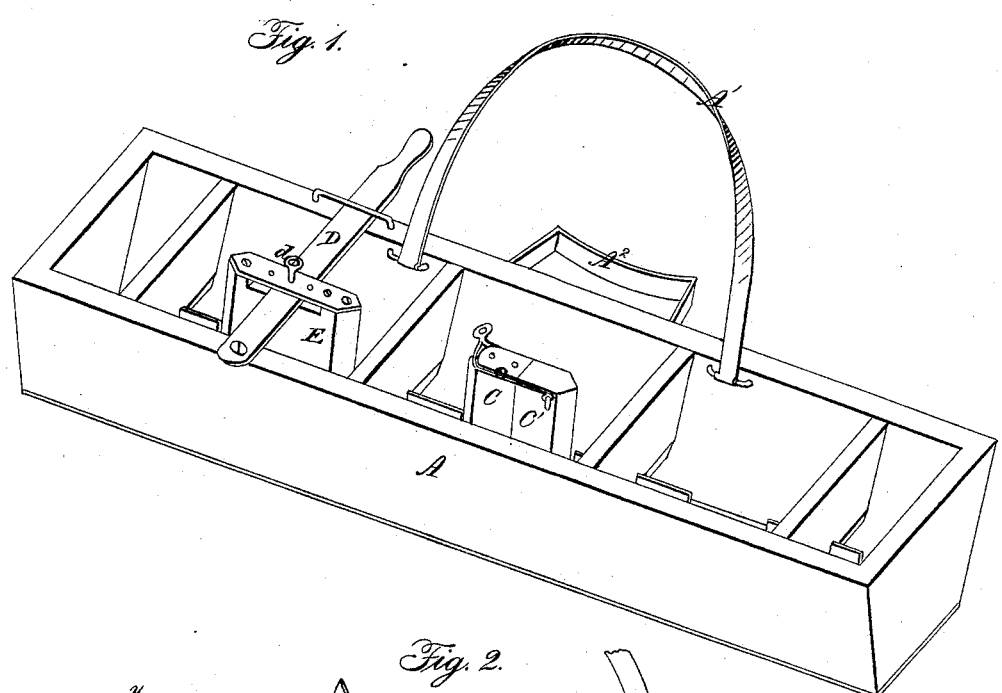
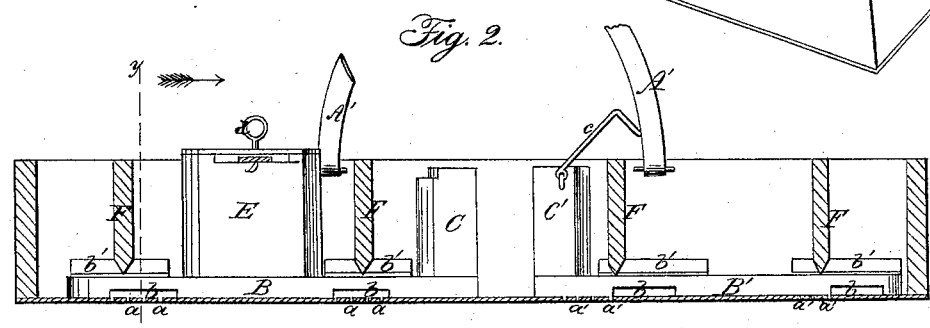
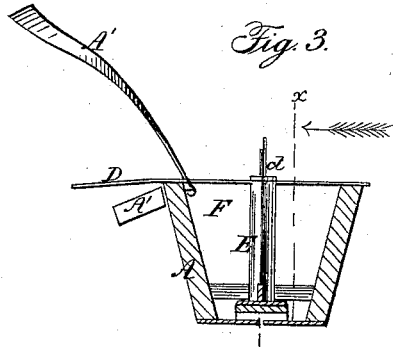
Witnesses:                              Inventor:

UNITED STATES PATENT OFFICE.

I. M. HARSHBARGER, OF BRANDONVILLE, WEST VIRGINIA.

IMPROVED SEED-SOWER.

Specification forming part of Letters Patent No. 45,923, dated January 17, 1865.

*To all whom it may concern:*

Be it known that I, I. M. HARSHBARGER, of Brandonville, in the county of Preston and State of West Virginia, have invented a new and useful Improvement in Seed-Sowers; and I do hereby declare the following to be a full and exact description of the same, reference being had to the accompanying drawings, making part of this specification, in which—

Figure 1 is a perspective view of a seed-sower embodying my invention. Fig. 2 is a vertical longitudinal section of the same in the line $x$ $x$, Fig. 3. Fig. 3 is a transverse section of the same in the line $y$ $y$, Fig. 2.

Similar letters of reference indicate corresponding parts in the several figures.

This invention pertains principally to that class of seed-sowers which are suspended by a band or strap passing over the shoulders of a person who in walking over the ground where the seed is to be sown regulates the flow and keeps the seed in an agitated state by working a hand-lever.

The improvement consists in forming the seed-slide in two or more parts or sections, and in means whereby such sections may be coupled and disconnected at will, in order that the flow of seed from the apertures beneath one section may be temporarily suspended while the flow from the other apertures continues, in passing trees or contracted spaces where an excessive quantity of seed would be deposited if all the apertures were opened simultaneously.

The following description will enable others skilled in the art to which my invention appertains to fully understand and use the same.

In the accompanying drawings, A represents a hopper designed to be supported in front of the operator by means of a band, A', which passes over the shoulders. The hopper is held off from against the person to prevent discomfort by a breast-plate, A². In the bottom of the hopper is a seed-slide composed of two pieces, B B', placed end to end, as shown in Fig. 2, and provided at their contiguous ends with upright pieces C C', to one of which, C', is hinged or pivoted a coupling-link, $c$, which, when turned down over the piece C, as in Fig. 1, causes the two sections to move together. By turning up the link $c$ so as to disengage it from the piece C the section B receives motion from a lever, D, while the section B' remains immovable in such position as to prevent the flow of seed from the apertures $a'$, over which the section B' moves. The section B of the slide moves over the seed-apertures $a$, and both sections are provided with cut-off recesses $b$, into which the seed passes from the interior of the hopper A. Both sections B B', when coupled, receive a simultaneous reciprocatory movement from the lever D, which is pivoted to the front of the hopper A and to an upright piece E, affixed to the section B. The bolt or pin $d$, by which the lever is pivoted to the piece E, may be inserted in either of a series of orifices, $e$, whereby the extent of movement of the slide B B' may be varied so as to adapt the recesses $b$ to allow seed to flow through a greater or less number of the apertures $a$ $a'$, and thus increase or diminish the quantity of seed dropped upon a given area of ground. The slide B B', while moving back and forth within the hopper, is held in a central position by the guides $b'$, working in the partitions F.

It will be observed that the operator has one hand free, with which he may turn the link $c$ up or down, and thus disconnect or couple the sections B B', as before explained. Any suitable device for connecting and disconnecting the sections B B' may be substituted for the link $c$.

Having thus described my invention, what I claim as new herein, and desire to secure by Letters Patent, is—

Forming a seed-slide in two or more sections adapted to be connected and disconnected by the employment of a link, $c$, or its equivalent, substantially as and for the purpose herein described.

The above specification of my improvement in seed-sowers signed this 29th day of October, 1864.

I. M. HARSHBARGER.

Witnesses:
J. E. HAGANS,
A. D. HAGANS.